United States Patent [19]
Erb

[11] Patent Number: 5,007,166
[45] Date of Patent: Apr. 16, 1991

[54] METHOD OF DECREASING AIR/FUEL LEAKAGE IN A CARBURETOR

[76] Inventor: Gary H. Erb, 513 N. Cherry, O'Fallon, Ill. 62269

[21] Appl. No.: 442,623

[22] Filed: Nov. 29, 1989

[51] Int. Cl.⁵ .................. B23P 15/00; B01D 47/00
[52] U.S. Cl. ................. 29/888.011; 29/521; 29/402.05; 29/432; 277/166; 277/235 B; 261/34.1
[58] Field of Search ........... 29/156.4 R, 401.1, 402.4, 29/402.5, 402.6, 432, 432.1, 432.2, 525.1, 521, 888.3, 890.09, 888.01, 888.011; 277/166, 189, 213, 235 B; 261/34.1

[56] References Cited

U.S. PATENT DOCUMENTS

| | | | |
|---|---|---|---|
| 1,378,698 | 5/1921 | Lindstrom | 81/44 |
| 2,213,574 | 9/1940 | Weston | 72/479 |
| 2,285,025 | 6/1942 | French | 72/463 |
| 2,526,732 | 10/1950 | Cogsdill | 206/373 |
| 2,702,577 | 2/1955 | Harrison et al. | 72/358 |
| 2,765,877 | 10/1956 | Bourcier de Carbon | 277/166 |
| 2,790,477 | 4/1957 | Gargrave | 72/489 |
| 4,056,190 | 11/1977 | Dix | 206/349 |
| 4,087,912 | 5/1978 | Granone | 30/366 |
| 4,100,663 | 7/1978 | Crum | 29/426.1 |
| 4,185,486 | 1/1980 | Van Geffen | 72/71 |
| 4,199,060 | 4/1980 | Howard | 206/231 |
| 4,277,423 | 7/1981 | Noguez | 261/34.1 |
| 4,715,499 | 12/1987 | Franklin | 206/373 |

Primary Examiner—Joseph M. Gorski
Assistant Examiner—S. Thomas Hughes
Attorney, Agent, or Firm—Fleit, Jacobson, Cohn, Price, Holman & Stern

[57] ABSTRACT

A method and apparatus is provided whereby a fluid-tight seal is at least substantially assured between registered passage ends opening through mating surfaces of removably secured together components having a gasket sheet disposed therebetween provided with openings communicating the aforementioned registered passage ends. The method includes staking at least one of the mating surfaces with an elongated rod-like staking tool equipped with a first impact tool engaging end and a second work engaging end defining a circular ridge extending thereabout beveled both internally and externally to provide a resonably sharp circular apex edge, the circular apex edge being at least slight larger in diameter than the diameter of the corresponding passage end and with the staking operation forming a circular groove in the corresponding mating surface as well as circular ridges in the corresponding mating surface immediately inwardly of and outwardly of the circular groove formed in the corresponding mating surface by the staking operation.

8 Claims, 2 Drawing Sheets

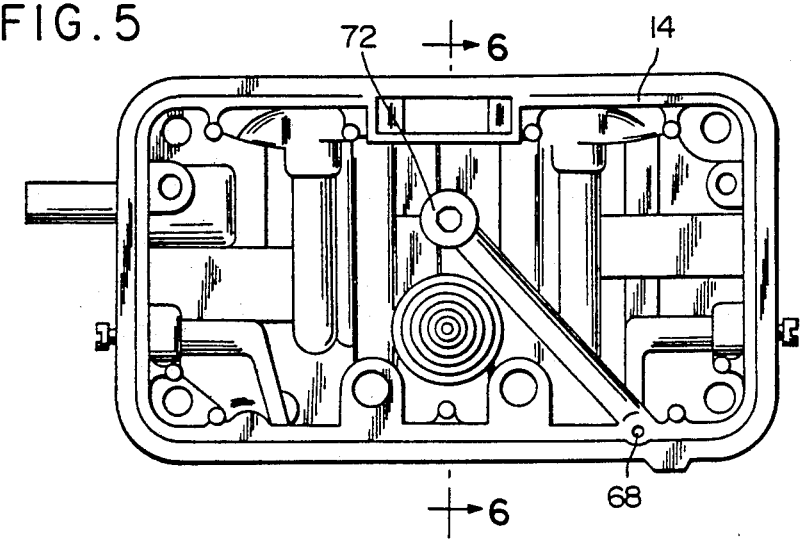
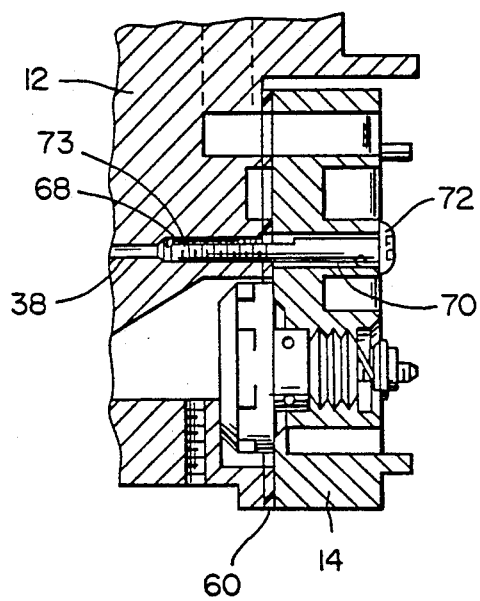
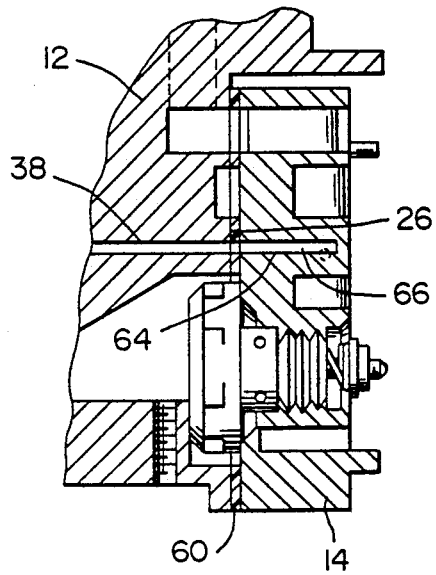
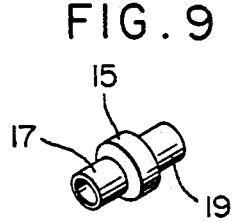
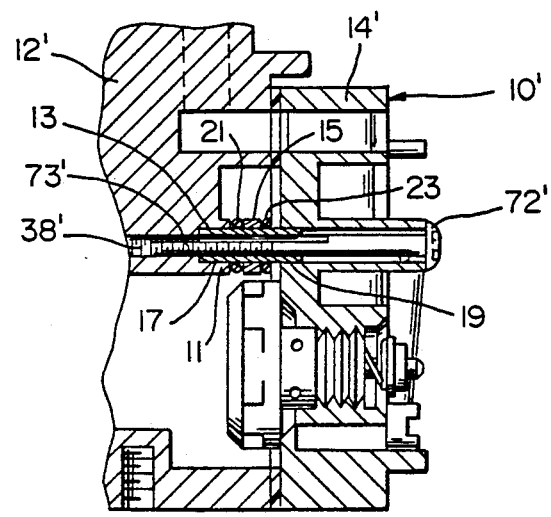

METHOD OF DECREASING AIR/FUEL LEAKAGE IN A CARBURETOR

BACKGROUND OF THE INVENTION

1. Field of the Invention

This invention relates to a method and apparatus for at least substantially eliminating air and/or fuel leakage between the mating carburetor body and metering block or jet plate surfaces of a carburetor equipped with separable main body and metering block or main jet plate components having a gasket sheet disposed therebetween.

By eliminating substantially all leakage between the main body and metering block mating surfaces, the metering of air and fuel by the carburetor may be substantially that designed into the manufacture of the carburetor and the carburetor may therefore operate with greater efficiency and result in greater power output and smoother operation of the associated combustion engine.

2. Description of Related Art

Various different tools heretofore have been provided which could be used to form a slight raised area around a bore end and various methods have been used heretofore in conjunction with carburetors and the like for minimizing leakage of air and fuel between adjacent components. Examples of some of these previously known tools and methods are disclosed in U.S. Pat. Nos. 1,378,698, 2,213,574, 2,285,025, 2,526,723, 2,702,577, 2,790,477, 4,056,190, 4,087,912, 4,100,663, 4,185,486, 4,199,060 and 4,715,499. However, these prior patents do not disclose the structure and method by which leakage of fuel and/or air between mating surfaces of separable carburetor components may be substantially entirely eliminated.

SUMMARY OF THE INVENTION

Various different forms of carburetors include separable metering block and main body components provided with mating faces between which a gasket sheet is disposed and with the faces of the components having registered air and fuel passage ends opening therethrough communicated by openings formed through the attendant gasket sheet.

While the gasket sheet serves to prevent substantial leakage of air and fuel between the mating surfaces, because of the complexity of the air and fuel passages in some carburetors and the fact that some carburetors have their main components constructed of relatively soft metal, shank type fasteners conventionally utilized to removably secure main carburetor components together cannot always be most advantageously positioned for the elimination of air or fuel leakage between the mating faces and the threaded fasteners cannot be excessively tightened. Furthermore, carburetors including separable main body and metering block components of the type specifically disclosed and described hereinafter usually do not include mating faces which are precisely machined.

Accordingly, even in newly constructed carburetors (which have not been subject to repeated heating and cooling over long periods of time) some air and fuel leakage usually occurs between the mating faces of removably attached main carburetor components and, therefore, there is a need for a method and apparatus whereby air and fuel leakage between removably joined main carburetors components may be at least substantially eliminated.

The main object of this invention is to provide a method and apparatus for treating at least one of the mating surfaces of a pair removably joined main carburetor components in a manner such that air and fuel leakage between the mating surfaces of the components may be at least substantially eliminated.

Another object of this invention is to provide a method and apparatus in accordance with the immediately preceding object and which may be carried out and used by even amateur carburetor repair persons.

Another very important object of this invention is to provide a method and apparatus which will not in itself alter the operation of an associated, but which will merely, to the greatest possible degree, enable air and fuel metering by the associated carburetor in the precise manner in which it was designed to meter air and fuel.

A final object of this invention to be specifically enumerated herein is to provide a method and apparatus in accordance with the preceding objects and which will be easy to carry out and conform to conventional forms of manufacture so as to provide a method and apparatus which may be quickly accomplished, inexpensive and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 5 is an outside elevational view of the fuel metering block removed from the carburetor body illustrated in FIG. 2;

FIG. 6 is an enlarged fragmentary vertical sectional view taken substantially upon the plane indicated by the section line 6—6 of FIG. 5 and illustrating the manner in which a new attaching screw has been added to the central area of the metering block with appropriate threads being provided therefore in the accelerator pump fuel passage, a portion of the attaching screw having a flat formed thereon;

FIG. 7 is an enlarged fragmentary vertical sectional view similar to FIG. 6, but prior to the modification of the carburetor body and metering block to receive the center attaching screw;

FIG. 8 is an enlarged fragmentary vertical sectional view similar to FIGS. 6 and 7 but illustrating the manner in which the center attaching or mounting screw is provides on a different model of carburetor; and FIG. 9 is an enlarged perspective view of the accessory fuel passage fitting utilized in the modification illustrated in FIG. 8.

DESCRIPTION OF THE PREFERRED EMBODIMENTS

Figure 1:
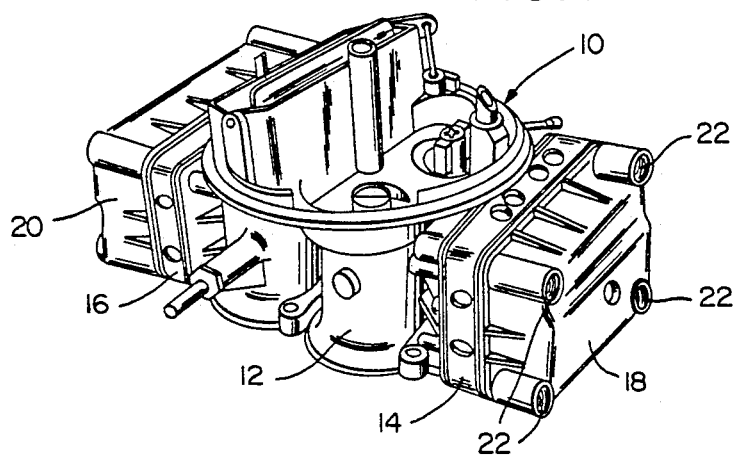
FIG. 1 is a perspective view of a first form of carburetor to be modified in accordance with the present invention.

Referring now more specifically to the drawings the numeral 10 generally designates a first form of carburetor which may be modified in accordance with the present invention. The carburetor 10 includes a main body 12, separable primary and secondary metering blocks 14 and 16 and separable primary and secondary fuel bowls 18 and 20.

Conventionally attaching bolts or screws are utilized to secure the primary metering block and the attendant primary fuel bowl as well as the secondary fuel block and attendant secondary fuel bowl to the carburetor body 12. Such attaching screws are inserted in the bores 22 which open outwardly through the outer sides of the primary fuel bowl 18 and similar bores (not shown) opening outwardly through the outer side of the secondary fuel bowl. These attaching screws are located about the side peripheries of the fuel bowls and clamp the metering blocks 14 and 16 between the respective fuel bowls 18 and 20 and the corresponding sides of the main body 12.

Figure 2:
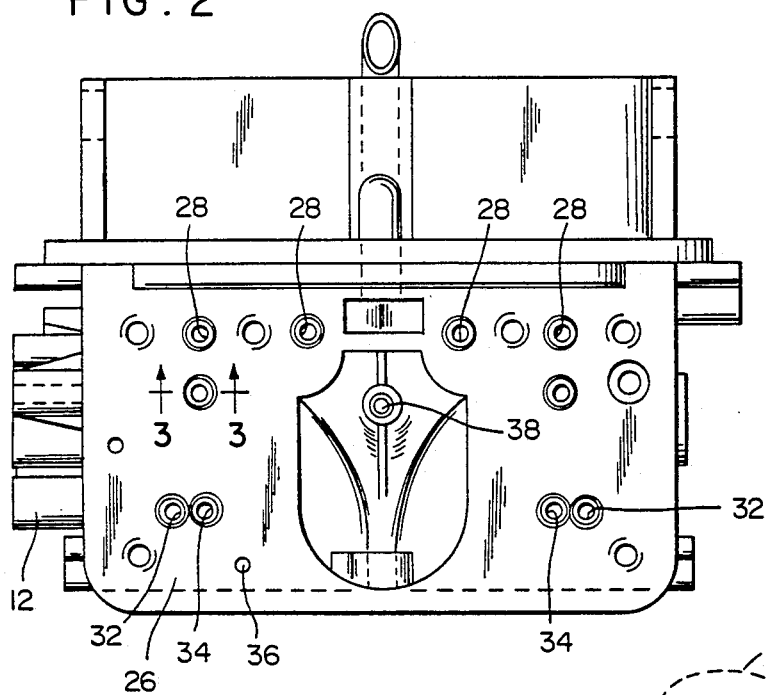
FIG. 2 is an enlarged elevational view of the carburetor illustrated in FIG. 1 as seen from the primary metering block side thereof and with the primary metering block and attendant primary fuel bowl removed, the air and fuel passage ends opening through the mounting face of the carburetor main body from which the primary metering block has been removed having been staked in accordance with the present invention.

FIG. 2 comprises an elevational view of the primary metering block side of the carburetor body 12 with the primary metering block 14 and attendant fuel bowl 18 removed. The body 12 includes a planar mounting face 26 through which pairs of air bleed passage ends 28, idle fuel passage ends 32, idle transfer passage ends 34, a distributor vacuum passage end 36 and accelerator pump passage end 38 open.

It is to be noted that the carburetor body 12 includes a mounting face corresponding to the mounting face 26 against which the secondary metering block 16 is mounted, with a gasket sheet therebetween, and that the mounting face of the body 12 opposing the secondary fuel block 16 includes passage ends corresponding, substantially to the passage ends, 32, 34, 36 and 38.

Figure 4:
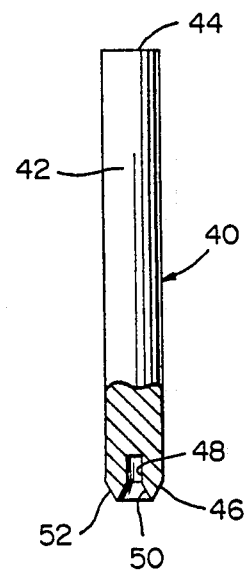
FIG. 4 is an elevational view of the staking tool by which the groove and ridges in FIG. 4 are formed, the work engaging end of the tool being partially broken away and illustrated in vertical section.

With attention now invited more specifically to FIG. 4, the reference numeral 40 generally designates a staking tool comprising an elongated rod member 42 having a first flat end 44 adapted to be struck by a hammer or other impact tool and a second work engaging end 46, the work engaging end 46 having a central blind bore 48 formed therein including an outer end tapering counter bore 50 and being externally beveled as at 52. The angle of the external beveling at 52 is substantially equal to the angle of the tapered counter bore 50 and the intersection of the external beveled surface 52 with the counter bore 50 defines a circular ridge extending about and concentric with the center axis of the rod member 42 and blind bore 48, the ridge being triangular or V-shaped in radial cross section.

Figure 3:
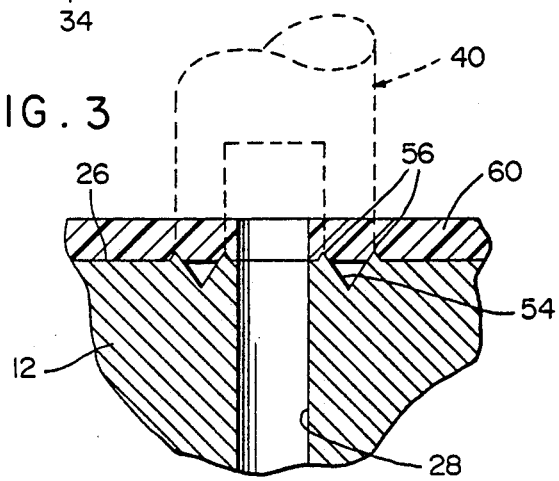
FIG. 3 is an enlarged fragmentary horizontal sectional view taken substantially upon the plane indicated by the section line 3—3 of FIG. 2 illustrating the manner in which a pair of concentric circular ridges are formed about the associated passage end with a circular groove being defined between the concentric ridges and illustrating the manner in which the concentric ridges form concentric circular zones of increased pressure engagement of the carburetor mounting face with the associated gasket sheet.

With attention now invited more specifically to FIGS. 2 and 3 of the drawings, the tool 40 is positioned at substantially 90° relative to the mounting face 26 with the work engaging end 46 concentric with one of the passage ends. Thereafter, the flat end 44 of the tool 40 is struck with a hammer or other suitable impact tool. This forms a circular groove 54 in the surface 26 about the passage ends 28, 32 and 34 substantially concentric with the latter and spaced . slightly radially outwardly therefrom. By staking the mounting face 26 in order to form the groove 54, a pair of circular ridges 56 are formed immediately inwardly and immediately outwardly of the groove 54 concentric with the latter by the displacement of the metal of the block 12 which occurs during formation of the groove 54. These ridges form circular zones of increased pressure engagement of the body 12 with the gasket sheet 60 disposed and clamped between the mounting face 26 and the opposing face of the metering block 14 upon reinstallation of the metering block 14 and fuel bowl 18 on the carburetor body 12. Also, the ridges 56 displace the circular band of the gasket sheet 60 disposed therebetween slightly into the groove 54 Thus, three concentric zones of increased pressure engagement between the body 12 and the gasket sheet 60 are provided when the metering block 14 and fuel 18 are reassembled to the carburetor 12. Still further, the zones of increased pressure engagement of the ridges 56 with the gasket sheet 60 also provide circular zones of increased pressure engagement of the gasket sheet 60 with the fuel cover 18 due to the thinness of the gasket sheet 60.

Of course, the mounting face of the body 12 against which the metering block 16 is assembled also is staked in the same manner. Alternatively, if a metering block or equivalent structure of a carburetor also includes a plane surface through which air and fuel passage ends open, the metering block may be staked in the manner above described in lieu of staking the body 12.

With attention now invited more specifically to FIGS. 5, 6 and 7, FIG. 7 more clearly illustrates that the body 12 includes an accelerating pump passage 38 which opens through the mounting face 26 and with which the outlet end 64 of an accelerating pump passage 66 formed in the metering block 14 is registered. The inlet end 68 of the accelerating pump passage 66 opens into the interior of the primary fuel bowl 18.

Inasmuch as the attaching bolts or screws which hold the primary fuel bowl 18 and the metering block 14 against the body 12 are spaced about the side peripheries of the fuel bowl 18 and the metering block 14, the central area of the metering block 14 which mates against the central area of the mounting face 26 is not tightly clamped thereagainst and represents a prime location for fuel leakage between the mounting face 26 and the metering block 14. However, in order to provide additional clamping action in this area, the metering block 14 is drilled oversize as at 70 completely through the metering block 14 and the body 12 is drilled oversize to a lesser degree as at 68 and internally threaded.

When the metering block is first reassembled to the body 12 an additional threaded bolt 72 is secured through the metering block 14 and threadingly engaged in the enlarged internal threaded portion 66 of the accelerating pump passage 38. Then, the primary fuel bowl 18 is secured in place through the aforementioned threaded fasteners.

In a second form of carburetor referred to in general by the reference numeral 10', the previously described staking operation is carried out, but the boss portion 11 of the body 12' corresponding to the body 12 does not extend the opposing face of the metering block 14'. Accordingly, in addition to drilling over size and threading the outer end of the passage 38' corresponding to the passage 38, the outer end of the passage 38' is provided with a smooth counter bore 13 and an accessory fuel passage fitting 15 has one end 17 thereof received in the counter bore 13 and the other end 19 thereof received in the opposing end of the bore formed through the metering block 14' for receiving the bolt 72' therethrough. Also, a pair of O-rings 21 and 23 are disposed on the ends 17 and 19 and serve to form fluid-type seals between the accessory fuel passage fitting 15 enlarged central portion and the body 12' and fuel metering block 14', the shanks of the fasteners 72 and 72' being flattened at 73 and 73', respectively, in order to allow the passage of fuel therepast.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method of decreasing air/fuel leakage in a carburetor including a main body defining at least one air-fuel mixture intake passage extending therethrough and a planar mounting face upon which a main jet plate is mounted with a planar face of said jet plate closely opposing said mounting face and a gasket sheet disposed and clamped between said faces and having a plurality of openings therethrough communicating with a plurality of corresponding air and fuel passage ends, each having a given diameter, opening through said faces in registry with other, said method comprising:
   (a) separating said main body from said jet plate and said gasket sheet;
   (b) forming circular grooves in one of said faces about the corresponding passage ends and forming at least one circular raised ridge on said one face substantially concentric with and radially adjacent each groove; and
   (c) reassembling said main body and said jet plate with said gasket sheet clamped therebetween, said circular raised ridges forming zones of increased pressure engagement between said one face and said gasket sheet about the corresponding passage ends by penetrating said circular raised ridges into said gasket sheet.

2. The method of claim 1 wherein the step of forming circular grooves and circular raised ridges is performed by staking said one face about each of said passage ends through utilization of a staking rod member having a first impact tool engaging end and a remote second work engaging end defining a circular endwise outwardly facing ridge thereon of triangular radial cross section.

3. The method of claim 2 wherein said circular raised ridges are both internally and externally beveled with the internal and external bevels intersecting at a sharp circular apex edge slightly larger in diameter than the diameters of said passage ends.

4. The method of claim 1 wherein said planar mounting face and jet plate also include corresponding, registered and peripherally spaced attaching fastener bores opening therethrough and central registered accelerating pump passage ends and said gasket sheet includes a further opening therethrough communicating with the accelerating pump passage ends, said method further comprising;
   (d) drilling said accelerating pump passage end in said jet plate to an over sized diameter completely through said jet plate intermediate steps (a) and (c);
   (e) drilling over sized and tapping an end of said accelerating pump passage opening outwardly of said body to a maximum diameter smaller than the over sized diameter of the drilled passage end through said jet plate intermediate steps (a) and (c); and
   (f) installing a threaded attaching bolt through the accelerating pump passage drilled through said jet plate with said bolt threadingly engaged in the tapped accelerating pump passage end opening outwardly of said body, said bolt having a longitudinal flat formed on a length thereof extending into the accelerating pump passage drilled through said jet plate.

5. The method of claim 4, further comprising the step of (g) forming a smooth counter bore in the tapped end of said accelerating pump passage opening outwardly of said body and installing a shouldered tubular fuel flow fitting between said accelerating pump passage ends and installing an O-ring on opposite ends of said fitting between the shoulder of said fitting and said carburetor body and jet plate.

6. The method of decreasing air/fuel leakage between registered passage ends, each having a given diameter, opening through mating surfaces of removably secured together components having a gasket sheet disposed therebetween equipped with an opening communicating said passage ends, said method comprising:
   (a) separating said components from each other and sad gasket sheet;
   (b) forming a circular groove in at least one of said mating surfaces about a corresponding passage end and forming at least one circular raised ridge on said at least one mating surface substantially concentric with and radially adjacent said groove; and
   (c) reassembling said components with each other and with said gasket sheet clamped therebetween, said circular raised ridge forming a zone of increased pressure engagement between said at least one mating surface and said gasket sheet by penetrating said circular raised ridge into said gasket sheet.

7. The method of claim 6 wherein the step of forming said circular groove and said circular raised ridge is carried out by staking said at least one mating surface about the corresponding passage end through utilization of a staking rod member having a first impact tool engaging end and a remote second end defining a circular endwise outwardly facing ridge thereon of triangular radial cross section.

8. The method of claim 7 wherein said circular raised ridge is both internally and externally beveled, with the internal and external bevels intersecting at a sharp circular apex edge slightly larger in diameter than the diameter of the corresponding passage end.

* * * * *